US006574666B1

(12) United States Patent
Dutta et al.

(10) Patent No.: US 6,574,666 B1
(45) Date of Patent: Jun. 3, 2003

(54) SYSTEM AND METHOD FOR DYNAMIC RETRIEVAL LOADING AND DELETION OF PACKET RULES IN A NETWORK FIREWALL

(75) Inventors: Partha P. Dutta, San Jose, CA (US); Dalibor F. Vrsalovic, Sunnyvale, CA (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/422,954

(22) Filed: Oct. 22, 1999

Related U.S. Application Data

(60) Provisional application No. 60/105,197, filed on Oct. 22, 1998.

(51) Int. Cl.[7] .............................................. G06F 15/16
(52) U.S. Cl. ...................... 709/227; 709/224; 709/225; 709/229; 713/151; 713/164; 713/201
(58) Field of Search ................................ 709/223, 224, 709/225, 227–229; 713/200–202, 150–154, 160–162, 164

(56) References Cited

U.S. PATENT DOCUMENTS

| | | | | |
|---|---|---|---|---|
| 5,473,607 A | | 12/1995 | Hausman et al. ............ 370/392 |
| 5,896,499 A | * | 4/1999 | McKelvey ................... 713/201 |
| 6,141,749 A | * | 10/2000 | Coss et al. ................... 713/162 |
| 6,154,775 A | * | 11/2000 | Coss et al. ................... 709/225 |
| 6,170,012 B1 | * | 1/2001 | Coss et al. ................... 709/229 |
| 6,212,184 B1 | * | 4/2001 | Venkatachary et al. ..... 370/392 |
| 6,233,686 B1 | * | 5/2001 | Zenchelsky et al. ......... 713/201 |
| 6,308,276 B1 | * | 10/2001 | Ashdown et al. ........... 713/201 |
| 6,321,338 B1 | * | 11/2001 | Porras et al. ................ 709/224 |

FOREIGN PATENT DOCUMENTS

| | | | | |
|---|---|---|---|---|
| EP | 0 762 707 A3 | 8/1997 | ........... H04L/29/06 |
| WO | 95/05549 | 2/1996 | ............. G06F/1/00 |

OTHER PUBLICATIONS

Bellovin, S..M., "Network Firewalls", IEEE Communications Magazine, vol. 32, No. 9, Sep. 1, 1994, pp. 50–57, XP000476555; p. 52, col. 1, In. 60; p. 54, col. 2, In 30.

* cited by examiner

*Primary Examiner*—Bharat Barot

(57) ABSTRACT

A system and method for loading a filtering rule at a firewall. A firewall receives a packet and determines if a rule that pertains to the packet is loaded at the firewall. If a pertinent rule is found, it is implemented and the action prescribed by the rule for the packet is performed. If no pertinent rule is found, then a pertinent rule is retrieved from a source external to the firewall, and loaded at the firewall. The rule is then implemented for the packet. After the rule expires, e.g., when the user logs off, the rule is deleted from the firewall.

17 Claims, 2 Drawing Sheets

SYSTEM AND METHOD FOR DYNAMIC RETRIEVAL LOADING AND DELETION OF PACKET RULES IN A NETWORK FIREWALL

CROSS REFERENCE TO RELATED APPLICATION

This application claims priority to provisional application No. 60/105,197 entitled "SYSTEM AND METHOD FOR DEMAND-DRIVEN LOADING OF RULES IN A FIREWALL," filed Oct. 22, 1998, the contents of which are incorporated herein by reference.

FIELD OF THE INVENTION

The field of the invention is information systems access control, and in particular the dynamic loading of a rule in a firewall.

BACKGROUND OF THE INVENTION

A firewall regulates the flow of packetized information. A packet includes a header and a payload. The header includes header parameters, such as a source address and destination address for the packet, as well as source and destination port numbers and a protocol number, flags, priority parameters, security information, etc. The payload includes the data meant to be conveyed by the packet from its source to its intended destination. A known firewall is placed between the packet's source and intended destination, where it intercepts the packet. The known firewall filters a packet based upon the packet's header parameters and a rule loaded into the firewall. The rule correlates a pattern in the header of a packet with a prescribed action, either PASS or DROP. The filter identifies the rule that applies to the packet based upon the packet's header, and then implements the rule's prescribed action. When a DROP action is performed, the packet is blocked (deleted), and does not reach its intended destination. When a PASS action is performed, the packet is passed onto ward its intended destination. The set of rules loaded into a firewall reflect a security policy, which prescribes what type of information is permissible to pass through the firewall, e.g., from which source, to which destination, for which applications, etc.

The set of rules loaded into a known firewall is static. The rules must typically be loaded with the intervention of a system administrator, and any changes to the rule set (additions, deletions, modifications) must also be implemented by the administrator. This disadvantageously limits the flexibility of the firewall to respond to changes in the security policy which it implements. Also, the firewall must disadvantageously store the entire set of rules implementing the security policy because the rules must be loaded manually. This is inefficient because it can require a large amount of memory resources, and increase the processor time needed to search for and locate a rule that applies to a given packet.

U.S. patent application Ser. No. 08/785,501, System and Method for Providing Peer-Level Access control on a Network, filed Jan. 17, 1997 now U.S. Pat. No. 6,233,686, discloses a firewall that dynamically loads a rule pertinent to the security policy of a peer when the peer is authenticated (e.g., logs on), and then deletes the rule when the peer logs off. Thus, for example, the rules pertaining to a peer are only stored at the firewall when the peer is logged on. This economically saves memory resources and reduces the search time and processor load to find a rule for a given packet. It also allows for greater flexibility because the peer rule set can be changed (e.g., by the peer) between the times it is loaded into the firewall.

Although the Peer-Level Access invention is more efficient and flexible than known firewalls, further improvements are needed in both areas. For example, while the peer's rule set is loaded at the filter, only a small fraction of the rules may actually be implemented, depending upon the type of packets received at the firewall. The rules that are loaded but not needed during a session (e.g., the time between peer logon and log off) disadvantageously increase processor time during rule searches and absorb memory resources at the firewall unnecessarily.

SUMMARY OF THE INVENTION

In accordance with an embodiment of the present invention, a rule is loaded at a firewall when it is needed to prescribe an action with respect to a packet that is received. When the packet is received, the rules loaded at the firewall are searched for a rule that is pertinent to the received packet. If no such rule is found, then a pertinent rule is retrieved from a source external to the firewall, and loaded at the firewall. The firewall then implements the rule with respect to the packet. In one embodiment, the packet is either allowed to pass on to its intended destination, or dropped, in accordance with the action prescribed by the retrieved rule. When the rule expires (e.g., no further packets are received that correspond to the rule), the rule is deleted. This advantageously minimizes the amount of memory resources required to keep a current set of rules at the firewall. It also advantageously reduces the load on the processor at the firewall by reducing the number of rules that must be searched to find a rule that pertains to a received packet. Latency is advantageously reduced because a pertinent rule can be found more quickly when it is stored at the firewall.

DETAILED DESCRIPTION

Figure 1:
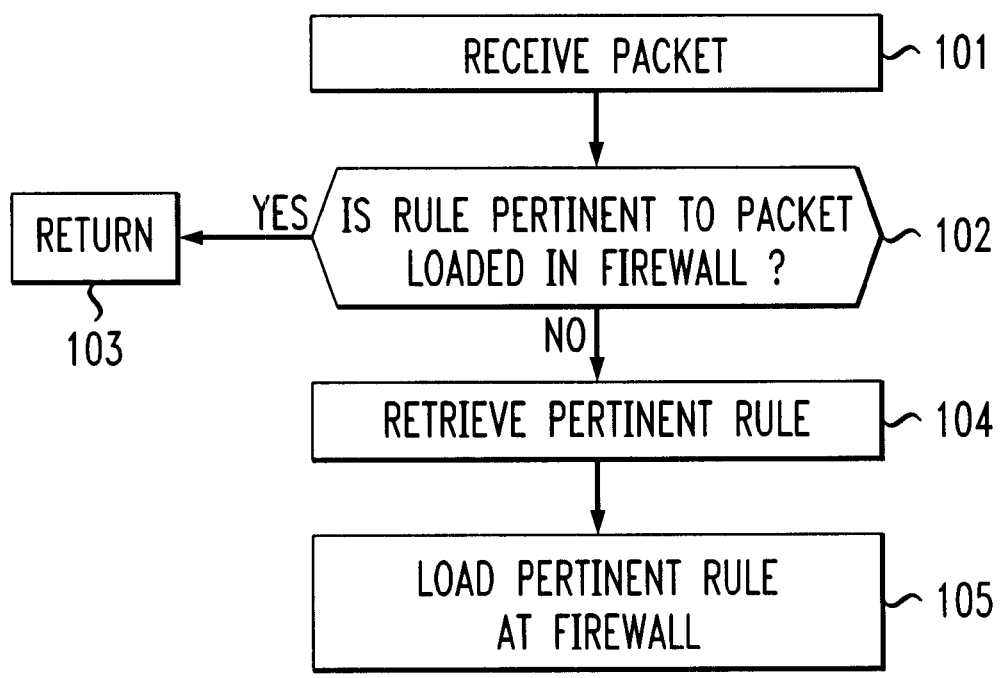
FIG. 1 is a flow chart illustrating the method in accordance with one embodiment of the present invention.

An embodiment of the method of the present invention is shown in FIG. 1. A packet is received at a firewall, step 101. As discussed above, a packet is a discrete unit of information. In one embodiment of the present invention, a packet includes a header and a payload. The header includes header parameters, such as source address, source port, destination address, destination port and protocol number. The payload of the packet includes data being conveyed by the packet, e.g., a connection request, document data, etc. An example of a packet is an Internet Protocol packet, described in RFC 791, <library.ucg.ie/CIE/RFC/791/index.htm, visited Sep. 23, 1998>.

After receiving the packet, the rules that are loaded at the firewall are searched to determine if they include a rule that is pertinent to the packet step 102. A rule is "pertinent" to a packet when the pattern of header parameters in the packet corresponds to a pattern in the rule. For example, a rule can be formulated to be pertinent to all packets. A rule can be pertinent to a packet from a given source address, regardless of its destination. Likewise, a rule can be formulated only to be pertinent to a packet with a given source address, source port, destination address, destination port and protocol number. Thus, a rule can be general, encompassing packets with different header parameters, or specific, encompassing only packets that have a single particular set of header parameters.

If a rule is found loaded in the firewall that is pertinent to the packet, a return condition is generated, step 103. In one embodiment, the return condition includes implementing the rule for the packet, i.e., performing a PASS or DROP action on the packet, as prescribed by the rule. In another embodiment, some additional processing is performed on the packet, e.g., the packet is forwarded to a program executing at the firewall.

If no pertinent rule is found loaded at the firewall, then a pertinent rule is retrieved in accordance with an embodiment of the present invention, step 104. In one embodiment, a database query is formulated (e.g., in the SQL database language) and sent to a database. In one embodiment, the query includes the header parameters of the packet. In one embodiment, the database is co-located with the firewall. In another embodiment, the database is at a remote location from the firewall. In response to the database inquiry, a rule that is stored at the database is identified and sent in a response to the query.

Once the pertinent rule has been retrieved (e.g., in the above example, the response has been received), the rule is loaded at the firewall, step 105. In one embodiment, the rule is then implemented for the packet, and a PASS or DROP action is performed with respect to the packet. In another embodiment, information pertaining to the packet is sent to a program executing at the firewall in order to initiate further processing of the packet.

In one embodiment of the present invention, a rule that was loaded is deleted when the rule expires. In one embodiment, a rule expires when no packet corresponding to the rule is received within a predetermined time interval. For example, if a rule is loaded to action a set of packets, and no other packet that implicates the rule is received within ten minutes of the time the last packet was acted upon by the rule, then the rule is said to expire, and is deleted. In another embodiment, when the packet that triggers the loading of the rule is identified as belonging to a message comprising a plurality of packets, when the last packet in the message is acted upon by the rule, then the rule is said to have expired and is deleted.

Figure 2:
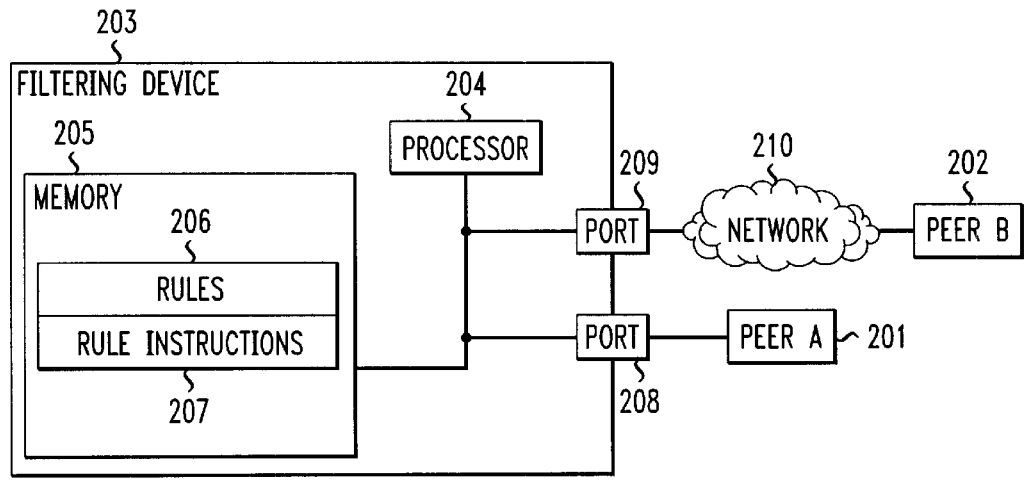
FIG. 2 shows an apparatus in accordance with an embodiment of the present invention.

An apparatus in accordance with an embodiment of the present invention is shown in FIG. 2. Peer A 201 (the sender) sends a packet of information addressed to destination Peer B 202 (the destination) through filtering device 203. Filtering device 203 comprises a processor 204, a memory 205 that stores firewall rules 206 and rule instructions 207 adapted to be executed by processor 204 to perform steps of the method in accordance with an embodiment of the present invention. The filtering device 203 also includes a first port 208 through which the packet is received from Peer A 201, and a second port 209 through which the packet will pass to Peer B 202 through network 210 if the pertinent rule prescribes a PASS action with respect to the packet. Ports 209 and 210, memory 205 and processor 204 are coupled. The term "coupled" is intended to encompass and be broader than the term "directly connected." If A is directly connected to B, and B is directly connected to C, then A is said to be "coupled" to C. In other words the term coupled includes the term "indirectly connected."

Peers 201 and 202 are each a computer with a permanent or temporary network address. Network 210 is any information systems network across which the information in the packet can be sent. Examples of network 210 include the Internet, an Internet, a virtual private network, etc.

In one embodiment, processor 204 is a general purpose microprocessor, such as the pentium II microprocessor manufactured by the Intel Corporation of Santa Clara, California. In another embodiment, processor 204 is an Application Specific Integrated Circuit (ASIC), which has been specifically designed to perform at least some of the steps of the method in accordance with an embodiment of the present invention. ASICs are well-known in the art for application such as digital signal processing. In an embodiment of the present invention that includes an ASIC, at least part of the rule instructions 207 can be implemented in the design of the ASIC.

Memory 205 can be Random Access Memory (RAM), a hard disk, a floppy disk, an optical digital storage medium, or any combination thereof. Memory 205 is meant to encompass any means for storing digital information, although at least part of the memory 205 should be writable. This enables the retrieved pertinent rule to be loaded at the firewall. The present invention encompasses memory structures that are distributed, i.e., the rules and instructions stored in memory 205 may be stored in separate structures that are accessible to the processor 204, for example, through a network. For example, in one embodiment, rules 206 are stored on a hard disk on a server coupled through a network to the processor 204, while the rule instructions 207 are stored in RAM coupled to the processor through a bus, the RAM, processor 204 and bus being co-located as parts of the same computer.

A firewall rule is known in the art. It correlates a pattern in a packet with a prescribed action, such as PASS or DROP.

Rule instructions 207 are adapted to be executed by processor 204 to receive a packet, determine if a rule pertinent to the packet is loaded at the firewall, and if there is no such pertinent rule, to retrieve a pertinent rule and load it at the firewall. In one embodiment, rule instructions 207 are further adapted to implement the pertinent rule for the packet, performing a rule action with respect to the packet.

In one embodiment of the present invention, rule instructions 207 are implemented in two parts: firewall instructions and fetching instructions. In one embodiment, these two sets of instructions are implemented as two separate processes executing on the same processor. In another embodiment of the present invention, two processors on two separate nodes are employed. A first processor executes the firewall instructions, and the second processor executes the fetching instructions. The first processor is coupled to the second processor, and both first and second processors are coupled to a memory. The processors and memory are coupled to at least one port through which a packet can be received and/or sent. In one embodiment, the firewall process (executing firewall instructions) is executed as a part of the kernel, i.e., at a relatively low level at which operating system processes are executed. Thus implemented, the firewall process can take advantage of the kernel's protected memory, rendering the firewall process robust and less vulnerable in the event of a system failure. In the kernel's protected memory, the firewall process is protected from user applications that are being executed.

The firewall process performs steps in accordance with an embodiment of the present invention including receiving a packet and determining if a pertinent rule is stored at the firewall. If no pertinent rule is found, the firewall process sends the packet header parameters to the fetching process (the executing fetching instructions), which in one embodiment is also implemented in the kernel, and in another embodiment is implemented at the application layer. The fetching process retrieves a pertinent rule and sends it to the firewall process, which loads it at the firewall. This embodiment advantageously separates the functions of the traditional firewall from retrieving a rule needed by the firewall for a packet. This keeps the firewall instructions relatively simple, and maintains a certain level of security by separating the firewall process from interactions with, e.g., an external database from which rules are retrieved to be loaded at the firewall.

Ports 208 and 209 shown in FIG. 2 only illustrate one embodiment of the present invention. In the embodiment shown in FIG. 2, port 208 is dedicated to communication with peer A 201, while port 209 is dedicated to communication with peer B 202 through network 210.

In another embodiment, there are a plurality of ports to and from numerous destinations. The port or ports that communicate packets to and from filtering device 203 are meant to encompass any number or configuration of ports. The port configuration is expected to vary to suit the particular connectivity required of a filtering device 203 in a given situation, i.e., in a given context or architecture in which parties communicate through filtering device 203. The implementation of the firewall in accordance with an embodiment of the present invention is advantageously scalable, in part because rules are only loaded when they are needed.

Figure 3:
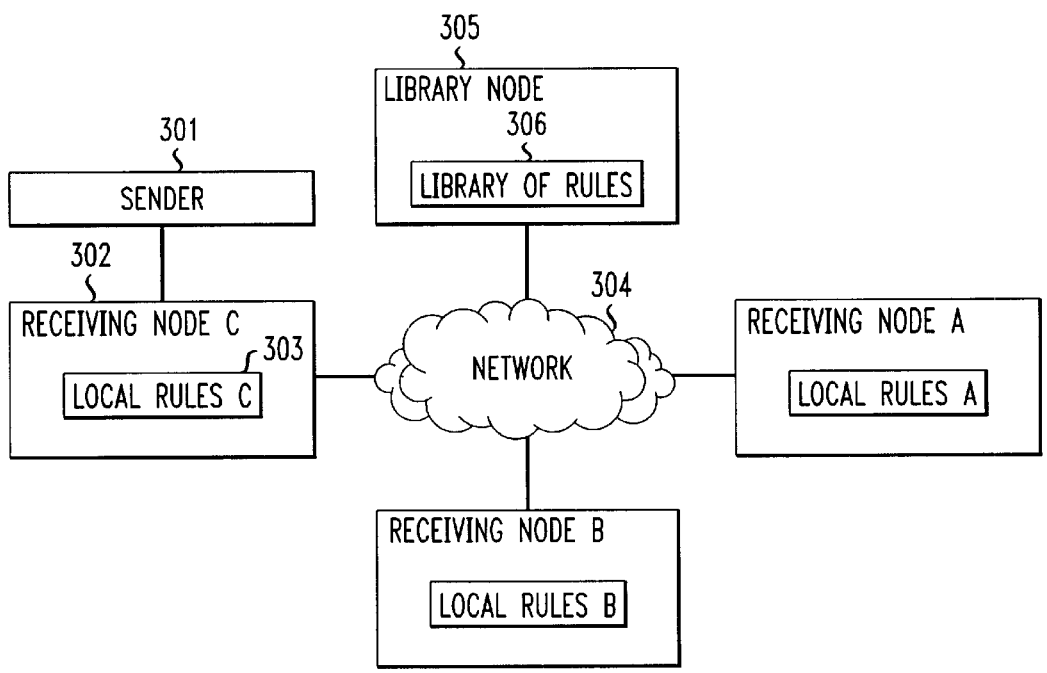
FIG. 3 shows a system in accordance with an embodiment of the present invention.

In various embodiments, the functions of the present invention are performed on separate nodes. In one embodiment shown in FIG. 3, a packet is received from a sender 301 at one of a plurality of receiving nodes 302, which node 302 then determines if it locally stores a rule 303 that is pertinent to the packet. If it does not store the pertinent rule locally 303, it sends a query through network 304 to another separate node 305 that can advantageously function as a central library that stores a large number of rules 306, only some of which may be needed at any one time by the plurality of receiving nodes 302. The library node 305 identifies the pertinent rule from its collection of rules 306, and then sends it to the requesting receiving node 302, which then implements it. This further illustrates the advantageous scalability of the present invention. Only relatively few library sites (in relation to the number of receiving nodes) need store large numbers of rules.

A medium that stores instructions adapted to be executed on a processor, like memory 205, is meant to encompass any medium capable of storing digital information. Examples of a medium that stores instructions include a hard disk, a floppy disk, a Compact Disk Read Only Memory (CD-ROM), magnetic tape, flash memory, etc.

The term "instructions adapted to be executed" is meant to encompass more than machine code. The term "instructions adapted to be executed" is meant to encompass source code, assembler, and any other expression of instructions that may require preprocessing in order to be executed by processor. For example, also included is code that has been compressed or encrypted, and must be uncompressed and/or unencrypted in order to be executed by a processor.

The present invention advantageously provides a more efficient and flexible system and method for implementing the rules of a security policy or policies at a filtering device, because a rule is only loaded at the filtering device when the rule is needed.

What is claimed is:

1. A method for loading a rule in a firewall, including:
   a. receiving a packet;
   b. determining if a rule pertinent to the packet is loaded in the firewall;
   c. if a rule pertinent to the packet is not loaded in the firewall, then:
      i. retrieving a rule that is pertinent to the packet based upon a header parameter of the packet; and
      ii. loading the rule that is pertinent to the packet into the firewall, at least one of said retrieving and said loading being implemented at a kernel layer.

2. The method of claim 1, said header parameter comprising at least one of a source address, source port, destination address, destination port and protocol number.

3. The method of claim 1, said retrieving the rule further comprising:
   submitting a query to a database; and
   receiving a response that includes the rule,
   at least one of said submitting a query and said receiving a response being implemented at the kernel layer.

4. The method of claim 3, wherein the rule is retrieved from a database at a remote location in relation to the firewall.

5. The method of claim 1, further comprising implementing the rule that is pertinent to the packet.

6. The method of claim 5, said implementing the rule further including:
   performing a DROP action on the packet.

7. The method of claim 6, said implementing the rule further including:
   performing a PASS action on the packet.

8. The method of claim 1, further comprising deleting the loaded rule when the rule expires.

9. The method of claim 8, wherein the rule expires when a user logs off.

10. An apparatus for loading a firewall rule, comprising:
    a. a processor;
    b. a memory coupled to said processor, the memory for storing at least one rule and rule instructions adapted to be executed by said processor for directing the processor to receive from a sender a packet addressed to a destination, determine if a rule pertinent to the packet is loaded in a firewall, and if a rule pertinent to the packet is not determined to be loaded in the firewall, then to retrieve a rule that is pertinent to the packet and load the rule that is pertinent to the packet in the firewall, at least one of said retrieval of the rule and loading of the rule being implemented at a kernel layer;
    c. means for coupling said processor and said memory to a sender and a destination.

11. The apparatus of claim 10, wherein said rule instructions are further adapted to be executed by said processor to implement the rule for the packet by performing at least one of a PASS and a DROP action with respect to the packet.

12. The apparatus of claim 10, wherein said rule instructions comprise firewall instructions and fetching instructions, wherein said firewall instructions are implemented at the kernel layer and said fetching instructions are implemented at an application layer, and wherein said firewall instructions are adapted to be executed by said processor to pass a packet for which no pertinent rule is loaded in the firewall to the fetching instructions executing on said processor, said fetching instructions being adapted to be executed on said processor to retrieve a pertinent rule from a database, and load the rule at the firewall.

13. The apparatus of claim 12, wherein said firewall instructions are further adapted to be executed by said processor to implement a rule for a packet by performing at least one of a PASS and a DROP action with respect to the packet.

14. A medium that stores processing instructions defining a method adapted to be executed by a processor, the method comprising:
   a. receiving a packet;
   b. determining if a rule pertinent to the packet is loaded in the firewall;
   c. if a rule pertinent to the packet is not loaded in the firewall, then:
      i. retrieving a rule that is pertinent to the packet; and
      ii. loading the rule that is pertinent to the packet in the firewall, at least one of said retrieving and said loading being implemented at a kernel layer.

15. The medium of claim 14, wherein said instructions are further adapted to be executed by said processor to implement the rule for the packet by performing at least one of a PASS and a DROP action with respect to the packet.

16. A system for loading a rule at a firewall, comprising:
   a. means for retrieving a packet;
   b. means for determining if a rule pertinent to the packet is loaded in the firewall;
   c. means for retrieving the rule that is pertinent to the packet; and
   d. means for loading the rule that is pertinent to the packet in the firewall, at least one of said means for retrieving and said means for loading being implemented at a kernel layer.

17. The system of claim 16, further comprising means for implementing the rule for the packet by performing at least one of a PASS and a DROP action with respect to the packet.

* * * * *